United States Patent [19]
Kattke et al.

[11] Patent Number: 5,521,912
[45] Date of Patent: May 28, 1996

[54] TIME SLOT SHIFTER ENHANCES DATA CONCENTRATION

[75] Inventors: Gerald W. Kattke, Naperville; William F. Pranaitis, Jr.; Paul M. Wempe, both of St. Charles, all of Ill.

[73] Assignee: AT&T Corp., Murray Hill, N.J.

[21] Appl. No.: 360,158

[22] Filed: Dec. 20, 1994

[51] Int. Cl.⁶ ........................................ H04J 3/02
[52] U.S. Cl. ................................. 370/56; 370/68
[58] Field of Search .......................... 370/56, 68, 108, 370/112; 340/825.03; 307/407, 409, 410, 411

[56] References Cited

U.S. PATENT DOCUMENTS

| | | | |
|---|---|---|---|
| 3,740,483 | 6/1973 | Pedersen | 370/68 |
| 3,786,192 | 1/1974 | Chow | 370/68 |
| 3,924,077 | 12/1975 | Blakeslee | 370/56 |
| 4,353,129 | 10/1982 | Nishiwaki | 370/108 |
| 4,811,367 | 3/1989 | Tajika | 370/108 |
| 5,331,632 | 7/1994 | Aaron et al. | 370/68 |

*Primary Examiner*—Douglas W. Olms
*Assistant Examiner*—Min Jung
*Attorney, Agent, or Firm*—Charles L. Warren

[57] ABSTRACT

A data shift register receives and stores each time sample (digital word) carried by an inbound channel. A selector chooses for each time slot either the input digital word received during the same time slot or the digital word stored in the shift register during the previous time slot. This selected digital word is transmitted on an input channel to a concentrator. The selector is controlled by data stored in a control shift register which causes the selector to make its selection.

17 Claims, 2 Drawing Sheets

TIME SLOT SHIFTER ENHANCES DATA CONCENTRATION

BACKGROUND OF THE INVENTION

This invention is generally directed to data concentration in a time division multiplexed system in which time slot shifting is used. This invention is especially, but not exclusively, suited for use in a telecommunication system in which information to be transmitted during a call is transmitted during an assigned time slot as a digital sample of the information.

Telecommunication networks such as supported by the AT&T 5ESS® switch support a plurality of telephone calls in which the subscribers' information is carried by digital words representing time samples of the information. Such systems utilize a sequence of time slots, such as every 125 microseconds, in which samples of information are represented by digitized words, such as pulse code modulation encoding of the analog information. In order to conserve bandwidth and maximize transmission line efficiencies, a plurality of such digitized samples are combined to form a consecutive sequence of digital words (time slots) carried by communication channels. A concentrator receives a plurality of subscriber channels as inputs and translates these inputs to output channels which are fewer in number than the input channels. The purpose of the concentrator is to maximize efficiency by recognizing that only a percentage of the total number of subscribers will be making concurrent calls at any given time. The purpose of the concentrator is to eliminate unused time slots on its outbound channels by packing the inbound time slots on its outbound channels to maximize available bandwidth.

Such systems typically utilize a time slot interchanger (TSI) to shift the position of a time slot to prevent an over capacity situation which could result when the number of inbound time slots to be transmitted during a given time slot exceed the number of outbound channels on the concentrator. The TSI consists of memory sufficient to store the digital words associated with each time slot in a frame and a corresponding control memory corresponding to each time slot in the frame to control which stored time slots are to be transmitted at each time slot position within the frame. Such an implementation provides a maximum of flexibility since each digital word may be shifted to any time slot within the frame. However, such flexibility has the disadvantages of being relatively expensive, requiring substantial memory, and introducing significant delay. Thus, there exists a need for an economical and simplified mechanism, and method, for providing time slot shifting to support concentration.

SUMMARY OF THE INVENTION

It is an object of the present invention to satisfy the above need by providing an economical and architecturally simplified time slot shifter which is capable of providing a time slot shifting function.

In accordance with an embodiment of the present invention, an exemplary time slot shifter includes a data shift register which receives and stores each time sample (digital word) carried by an inbound channel. A selector chooses for each time slot either the input digital word received during the same time slot or the digital word stored in the shift register during the previous time slot. This selected digital word is transmitted on an input channel to a concentrator. The selector is controlled by data stored in a control shift register which causes the selector to make its selection.

DETAILED DESCRIPTION

Figure 1:
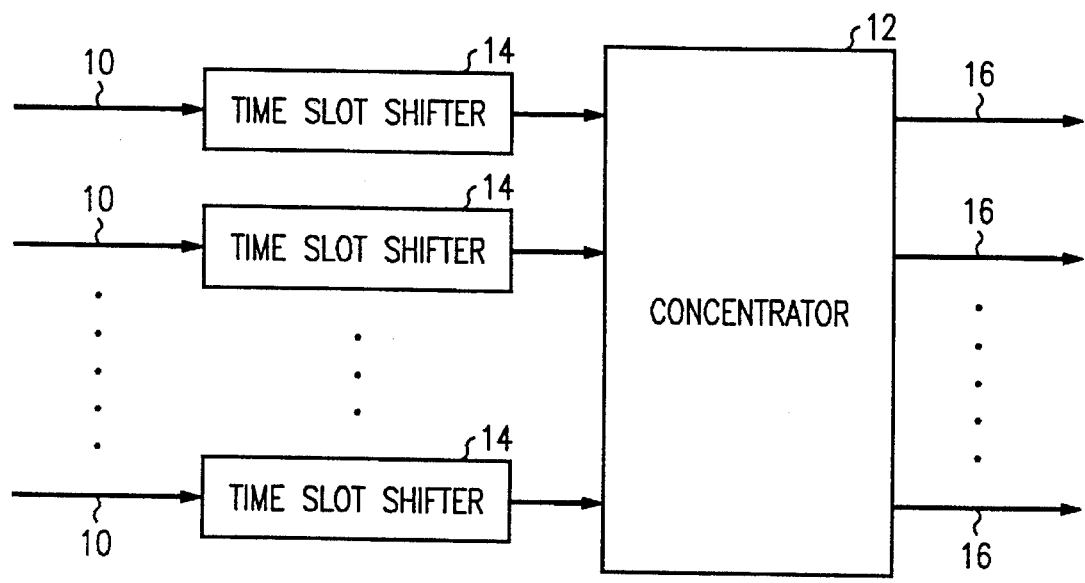
FIG. 1 is a block diagram illustrating a portion of a telecommunication system in which incoming channels carry time slots of information represented as digital words to be concentrated on a smaller number of output data lines.

FIG. 1 illustrates a plurality of communication channels 10 connected to concentrator 12 by corresponding time slot shifters (TSS) 14 in accordance with the present invention. The concentrator has a plurality of output channels 16 which carry compacted input data. In a typical environment, the number of input channels 10 will be substantially greater than the number of output channels 16. The concentrator 12, which is generally known in the art, is capable of routing a received digital word on one of its input lines to a corresponding time slot position on any of its output channels 16. The time slot shifter 14, as will be explained in more detail below, permits an incoming time slot to be either directly transmitted to concentrator 12 or delayed for one time slot before being delivered to the concentrator. A reason to delay the time slice exists when all of the corresponding time slots on each of the output channels 16 are already filled. Thus, no capacity is available during such a time slot to receive another time slice. The excess time slice is stored in the time slot shifter for delivery to the concentrator in the next time slot.

Figure 2:
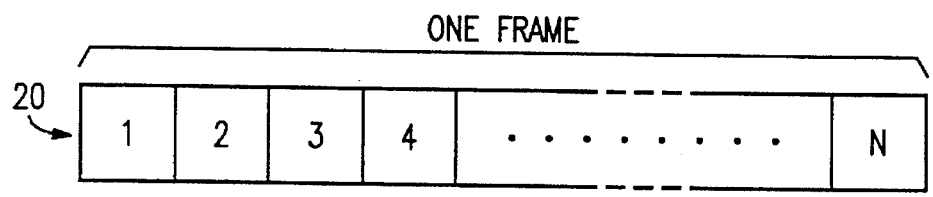
FIG. 2 illustrates a time slot data format in which N time slots exist during each frame.

FIG. 2 illustrates a data format showing a time frame 20 containing a plurality of N time slices (digital words). Each time slice may support a subscriber call. Each of the time slots in frame 20 may or may not carry data dependent on whether a corresponding call is in progress. For a frame during normal loading conditions, i.e. subscriber demand, a substantial number of the time slots will not be used, representing that no corresponding call is in progress. Each of the time slices shown in FIG. 2 may comprise an 8-bit PCM word.

Figure 3:
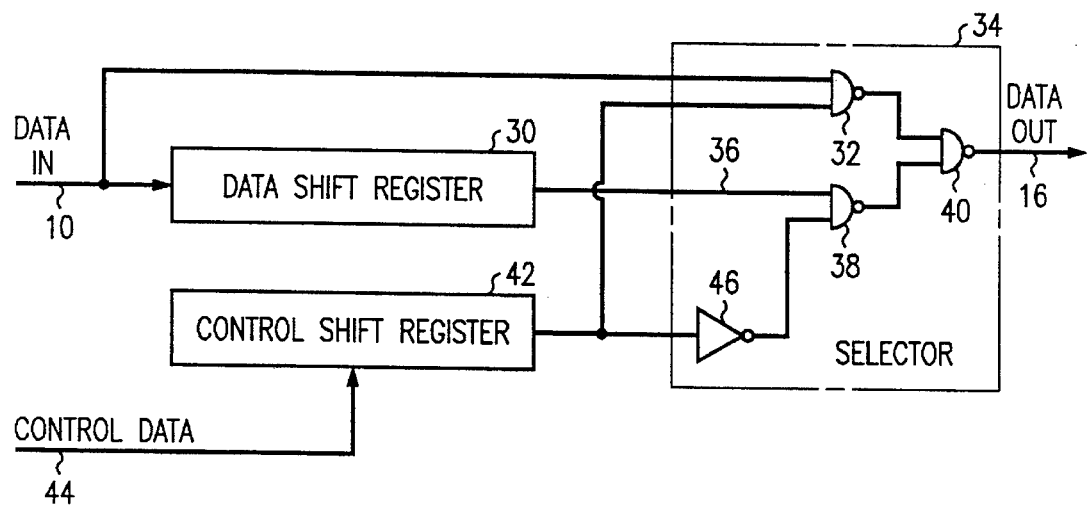
FIG. 3 illustrates an exemplary embodiment of a time slot shifter as shown in FIG. 1.

FIG. 3 illustrates an exemplary embodiment of a time slot shifter 14 as shown in FIG. 1. Each of the time slot shifters 14 can be identical. Digital words corresponding to each time slot of the frame 20 will be received on input channel 10 which is coupled to the data input of data shift register 30 and an input of NAND gate 32. The data shift register 30 accepts and stores each sequential digital word or time slice. The output of data shift register 30 is coupled by conductor 36 to an input of NAND gate 38. The other inputs to gates 32 and 38 provide selection control in which only one of gates 32 and 38 is enabled while the other is correspondingly disabled, that is, the enabled gate passes any data present on its other input while the disabled gate inhibits any output. The outputs of gates 32 and 38 are received as inputs by NAND gate 40 which provides an OR function thereby permitting the output from either of gates 32 and 38 to be passed to the output transmission channel 16.

A control shift register 42 stores one bit of control data for each of the N time slices contained in the frame 20. The control data defines for each corresponding time slice in frame 20 whether the new digital word on input channel 10 will be passed directly through gate 32 of selector 34 to the output channel 16, or whether the digital word stored in data shift register 30 during the previous time slot will be transmitted through gate 38 to output channel 16. An inverter 46 inverts the control signal from control shift register 42 before applying it to gate 38 as opposed to the direct application of the control signal to gate 32. This causes one of gates 32 and 38 to be enabled while the other disabled. Thus, the control bit stored in control shift register 42 corresponding to a time slot controls whether the new digital word is routed to output channel 16 or whether the new digital word will be stored in register 30 for delivery during the next time slot.

Figure 4:
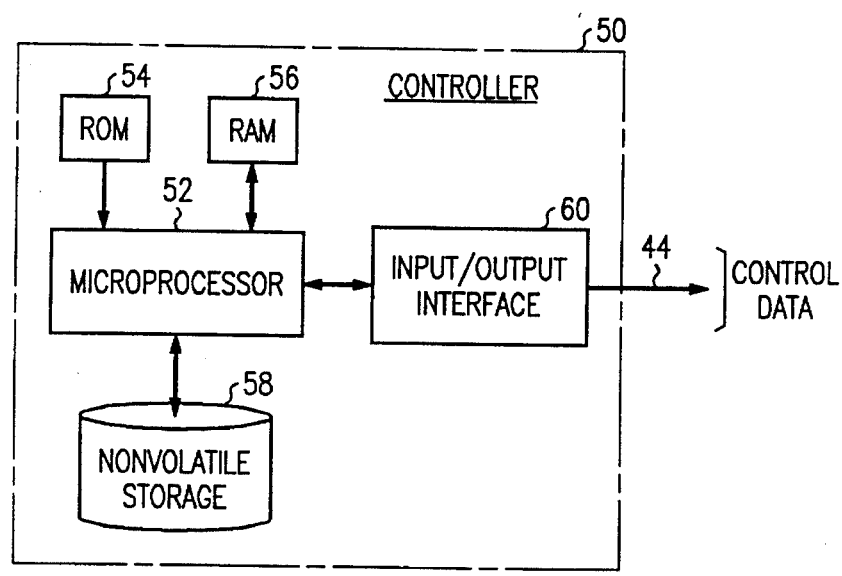
FIG. 4 illustrates an exemplary embodiment of a controller which operates in accordance with an embodiment of the present invention.

FIG. 4 illustrates an exemplary controller 50 utilized in a telecommunication system in accordance with the present invention. It includes a microprocessor 52 which is supported by read-only memory (ROM) 54, random access memory (RAM) 56, and nonvolatile storage device 58 which may comprise a hard drive or other nonvolatile storage media. An input/output interface 60 is coupled to processor 52 and facilitates the reception and transmission of data to the telecommunication system. In the illustrative embodiment, input/output interface 60 supports the transmission of the control data over channels 44 to each of the control shift registers 42 in the time slot shifters 14. The microprocessor 52 operates under program control instructions. In the illustrative embodiment RAM 56 includes a portion of memory representing a map of the control data to be transmitted to each control shift register 42 of the time slot shifters for at least one time frame. The controller 50 provides the processing and logic used to generate the control data transmitted to control shift register 42 and hence, controls the time slot interleaving of digital words on channels 16.

Table 1 below illustrates an example of the operation of the illustrative embodiment in accordance with the present invention.

TABLE 1

| SLOT | 1 | 2 | 3 | 4 | 5 | 6 | ... |
|---|---|---|---|---|---|---|---|
| INPUT DATA | X1 | X2 | X3 | X4 | 0 | X6 | ... |
| CONTROL DATA | 1 | 0 | 0 | 0 | 0 | 1 | ... |
| OUTPUT DATA | X1 | 0 | X2 | X3 | X4 | X6 | ... |

In Table 1, SLOT identifies illustrative time slots in one frame; INPUT DATA represents whether a digital word is received as an input by a time slot shifter 14 during each corresponding time slot (X(n)=digital word received and "0"=no data received); CONTROL DATA represents the output state of the control shift register 42 for the corresponding time slice; OUTPUT DATA represents the digital word, if any, output on channel 16 during the time slot. When control data=1, selector 34 directs the received digital word to the output channel. When control data=0, selector 34 causes the digital word, if any, stored in data shift register 30 to be transmitted to the output channel 16 during the time slot while the newly received digital word is stored in register 30.

Referring to Table 1, in time slot 1, digital word X1 is received and transmitted to output data channel 16 as determined by control data=1. During the second time slot, digital word X2 is received and stored in data shift register 30 in response to control data=0 resulting in no output data on channel 16 during time slot 2. During time slot 3, digital word X3 is shifted into shift register 30 as X2 is shifted out to output channel 16. In time slice 4, digital word X4 is received and stored in the data shift register while X3 is shifted out on data channel 16. In time slice 5, no digital word is present to be transmitted resulting in zeros being shifted into the data shift register as the stored data X4 is shifted out to data channel 16. In time slot 6, digital word X6 is routed through to data channel 16 as directed by control data =1. At the end of time slot 6, the time slot shifter according to Table 1 has now returned to the original condition in which no data (digital word) is stored in the data shift register. Therefore, the time slot shifter in the condition as shown in Table 1, following the sixth time slot, is now capable of again providing a one time slot shift of input data if needed to alleviate a congestion problem during a time slot.

TABLE 2

| SLOT | 1 | 2 | 3 | 4 | 5 | 6 | ... |
|---|---|---|---|---|---|---|---|
| INPUT DATA | X1 | X2 | X3 | X4 | X5* | X6 | ... |
| CONTROL DATA | 1 | 0 | 0 | 0 | 0 | 1 | ... |
| OUTPUT DATA | X1 | 0 | X2 | X3 | X4 | X6 | ... |

Table 2 which is similar to Table 1, illustrates a condition in which the states and conditions are identical to that of Table 1 through time slot 4. During time slot 4, digital word X4 is stored in register 30 while the previously stored digital word X3 is transmitted as output data on output channel 16 is directed by control data =0. Thus, at the beginning of time slot 5, the register 30 contains the data X4 which must be transmitted during time slot 5 since storage for only one time slot is supported. However, unlike Table 1, digital word X5, which represents a request for a new call, is sought to be handled during time slot 5. This call request must be denied as will be explained below.

In considering the operation of the exemplary time slot shifter, the data shift register 30 is loaded with the current digital word regardless of whether the word is concurrently coupled through gate 32 to output channel 16 or not. Referring to Table 2, in time slot 5, if the call corresponding to X5* was authorized, the digital word X4 would be transmitted during time slot 5 and the word X5* stored in register 30. However, in time slot 6, data X6 is required to be transmitted during time slot 6, i.e. control data =1, to the output channel 16 because of other time constraints in the system. If the X5* call had been authorized, this would cause the stored word X5* in register 30 to be overwritten by the word X6 since each input word is always written to register 30. Thus, the data corresponding to word X5* would have been lost. Because controller 50 predetermines the control data for an entire frame of time slots for each time slot shifter, this potential problem will not occur since controller 50 will inhibit the new call request which would have corresponded to word X5* in time slice 5. Thus, a requirement to directly transmit a digital word while a previous digital word is stored in register 30 will result in a denial of a new call which would lead to such a requirement. In the illustrative embodiment, digital word X5* in time slot 5 corresponds to a new call which will be denied because of lack of capacity.

Although this example illustrates a limitation in accordance with the embodiment of the present invention, it will be appreciated that the simplicity of the structure of the time slot shifter makes it economical to produce. It does provide the capability for a single time slot shift and hence, provides flexibility for the concentrator 12 to concentrate the digital words as contrasted with incoming digital words which can not be time delayed. The embodiment of the present invention is substantially more cost effective than a conventional TSI which requires more complex apparatus to achieve the ability to shift any time slot to any other time slot within the frame.

An important aspect of the present invention resides in the recognition that telecommunication systems which incorporate the present invention and are designed to normally operate at medium and low loads relative to maximum system capacity will achieve concentrations approaching that achieved by using a TSI. This provides an opportunity to achieve substantial savings and simplicity of operation by utilizing an embodiment of the present invention as compared with the more expensive and complex TSI implementations.

The time slot shifter is preferably followed by a concentrator whose concentration ratio can be adjusted to match the desired traffic level. The concentration ratio must be chosen so that the probability of blocking (being unable to serve a new call) is less than about 0.01. The following table shows a comparison of the traffic levels (in Erlangs) at the output of the concentrator used with a TSS and TSI for various concentration ratios and with a 0.01 probability of blocking:

| Concentration | 20:1 | 10:1 | 6:1 | 4:1 |
| --- | --- | --- | --- | --- |
| Traffic (TSS) | .80 | .85 | .89 | .91 |
| Traffic (TSI) | .81 | .87 | .92 | .95 | where 1.00 represents 100% loading (full capacity) and 0 represents no loading (empty). From this it can be seen that a system using a TSI is capable of carrying only slightly higher traffic than the same system using a TSS. At lower concentration ratios the TSI has an advantage in traffic capacity.

Although an embodiment of the present invention has been described above and illustrated in the drawings, the scope of the invention is defined by the claims which follow.

We claim:

1. In a telecommunication system having a plurality of communication channels each carrying digital words representing time samples of information, the digital words transmitted during corresponding time slots, sequential frames each contain a plurality of said time slots, the improvement comprising:

concentrator with input and output channels;

time slot shifters connected in series between the communication channels and the input channels of the concentrator, each time slot shifter comprising:

data shift register, coupled to the communication channel, stores each digital word received from the associated communication channel during a time slot and transmits on a first output channel a digital word stored during a previous time slot;

selector having a first input coupled to the first output channel of the data shift register, a second input coupled to the communication channel associated with the data shift register, and an output coupled to one of the input channels of the concentrator, the selector controlling which of the digital words received on its first and second inputs will be transmitted on its output to the associated input channel of the concentrator;

control shift register coupled to the selector and storing a control data word for each time slot in one of said frames, the control data word corresponding to one of the digital words being sent to the selector, the selector determining whether the digital word received on its first or second inputs will be transmitted on its output dependent on the control data word received from the control shift register for the corresponding time slot.

2. The system according to claim 1 further comprising a controller, coupled to the control shift register, generates and transmits the control data words corresponding to digital words in one frame to the control shift register prior to the digital words in said one frame being stored in said data shift register.

3. The system according to claim 2 wherein the controller generates and transmits new control data words to the control shift register for each frame which defines a repeating cycle of the time slots.

4. The system according to claim 1 wherein the selector comprises first and second gates associated with the first and second inputs, respectively, the first and second gates having another input which can inhibit the transmission through the gate of the digital word received on the first and second inputs.

5. The system according to claim 4 wherein one control data word from the control shift register is coupled to the another inputs and controls which of the first and second gates will be inhibited during a time slot.

6. The system according to claim 4 wherein the selector further comprises means for combining outputs from the first and second gates and transmitting the combined outputs to the output of the selector.

7. In a telecommunication system having a plurality of communication channels each carrying digital words representing time samples of information, the digital words transmitted during corresponding time slots, sequential frames each contain a plurality of said time slots, the improvement comprising:

time slot shifters connected to each of the communication channels, each time slot shifter comprising:

data shift register, coupled to a communication channel, stores each digital word received from the associated communication channel during a time slot and transmits on a first output channel a digital word stored during a previous time slot;

selector having a first input coupled to the first output channel of the data shift register, a second input coupled to the communication channel associated with the data shift register, and an output, the selector controlling whether the digital word received on its first or second inputs will be transmitted on its output;

control shift register coupled to the selector and storing a control data word for each time slot in one of said frames, the control data word corresponding to one of the digital words being sent to the selector, the selector determining whether the digital word received on its first or second inputs will be transmitted on its output dependent on the control data word received from the control shift register for the corresponding time slot.

8. The system according to claim 7 further comprising a controller, coupled to the control shift register, generates and transmits the control data word corresponding to digital words in one frame to the control shift register prior to the digital words in said one frame being stored in said data shift register.

9. The system according to claim 8 wherein the controller generates and transmits new control data words to the control shift register for each frame which defines a repeating cycle of the time slots.

10. The system according to claim 7 wherein the selector comprises first and second gates associated with the first and second inputs, respectively, the first and second gates each having another input which can inhibit the transmission through the gate of the digital word received on the first and second inputs.

11. The system according to claim 10 wherein one control data word from the control shift register is coupled to the another inputs and controls which of the first and second gates will be inhibited during a time slot.

12. The system according to claim 10 wherein the selector further comprises means for combining outputs from the first and second gates and transmitting the combined outputs to the output of the selector.

13. A method for selectively time shifting a digital word from a first time slot to second time slot, incoming digital words are carried on an inbound channel and outgoing digital words are carried on an outbound channel, a frame having a predetermined number of time slots wherein each time slot is represented by a digital word, the method comprising the steps of:

sequentially storing each incoming digital word in a data shift register;

transmitting on an output of the data shift register the incoming digital word stored during the previous time slot as a new incoming digital word is stored in the data shift register;

for each time slot, selecting one of the new digital word and the digital word transmitted at the output of the data shift register;

transmitting the one of the digital words to the outbound channel during each time slot;

generating a control data word for each time slot in a frame prior to the digital words in said one frame being output from said data shift register, the selecting step determining the one of the digital words to select based on the control data word corresponding to the time slot associated with the one digital word.

14. The method according to claim 13 wherein new control data words are generated prior to each new frame.

15. The method according to claim 13 wherein the selecting step includes the steps of routing the new digital word to a first gate and routing the digital word transmitted at the output of the data shift register to a second gate, the first and second gates each having another input which can inhibit the transmission of digital words through the gate.

16. The method according to claim 15 wherein the control data word is coupled to the another inputs of the first and second gates causing one of the first and second gates to be inhibited during a time slot and the other of the first and second gates to permit the digital word coupled to it to be transmitted through the other gate.

17. The method according to claim 16 wherein outputs from the first and second gates are combined to form a final output which is coupled to the outbound channel.

* * * * *